I. M. UPPERCU.
VALVE MECHANISM.
APPLICATION FILED FEB. 3, 1917.

1,346,617.

Patented July 13, 1920.
3 SHEETS—SHEET 1.

Attest:

Inventor:
INGLIS M. UPPERCU
by
Att'ys.

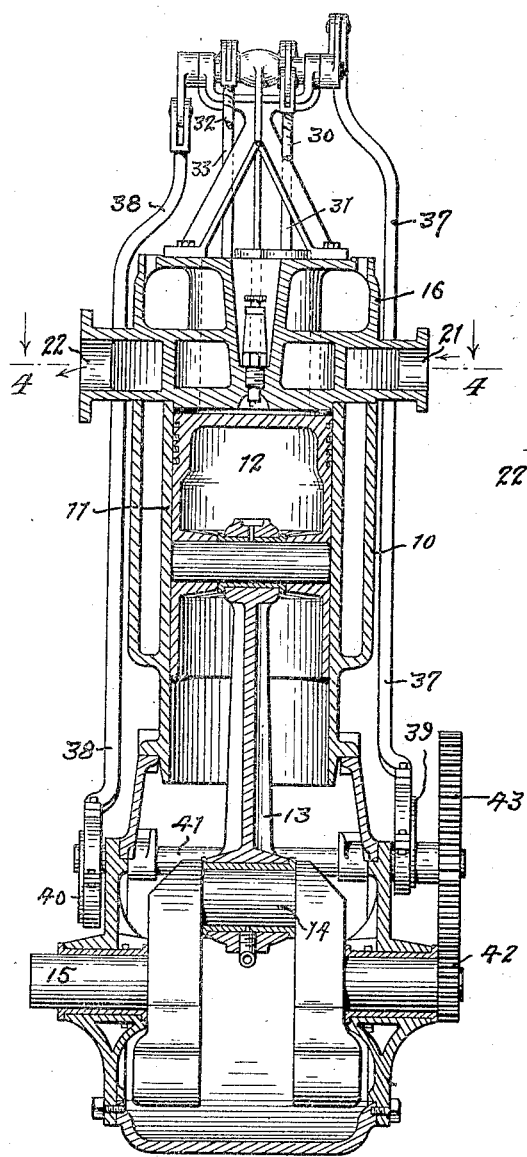
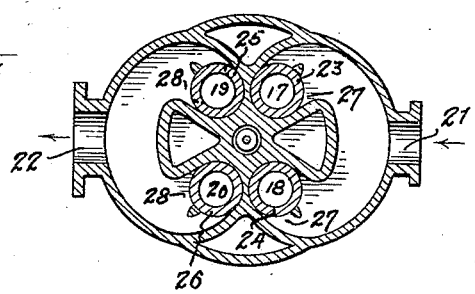

I. M. UPPERCU.
VALVE MECHANISM.
APPLICATION FILED FEB. 3, 1917.

1,346,617.

Patented July 13, 1920.
3 SHEETS—SHEET 3.

Attest:

Inventor:
INGLIS M. UPPERCU
by
Attys.

UNITED STATES PATENT OFFICE.

INGLIS M. UPPERCU, OF NEW YORK, N. Y.

VALVE MECHANISM.

1,346,617.  Specification of Letters Patent.  Patented July 13, 1920.

Application filed February 3, 1917. Serial No. 146,466.

*To all whom it may concern:*

Be it known that I, INGLIS M. UPPERCU, a citizen of the United States of America, and residing in the city, county, and State of New York, have invented a certain new and useful Improvement in Valve Mechanism, of which the following is a specification.

My invention relates to valve mechanisms and particularly to a valve mechanism for controlling ports opening to an engine power cylinder, the object of my invention being to provide valves so arranged and operated as to balance each other with respect to the pressure in the power cylinder. For the sake of simplicity I have confined the illustration of my invention to an explosion engine of the four-cycle type, but it will be understood that my valve mechanism has broad utility and may be employed to advantage in various apparatus other than explosion engines.

Referring to the accompanying drawings,

Fig. 3 is a section on the line 3—3, Fig. 1;

Fig. 4 is a section on the line 4—4, Fig. 3;

Figure 1:
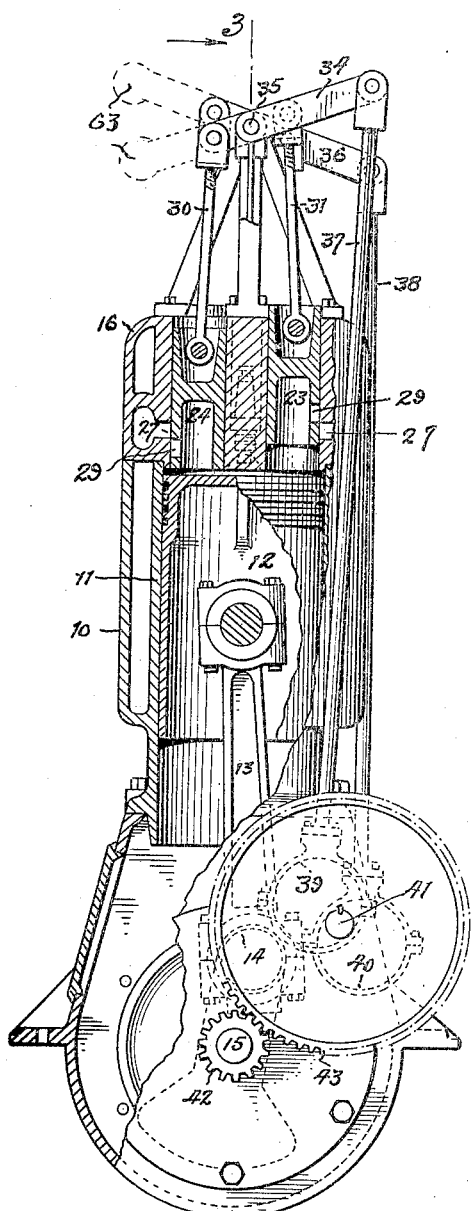
Figure 1 is a side elevation partially in section of a valve mechanism for a four-cycle explosion engine.
Figure 2:
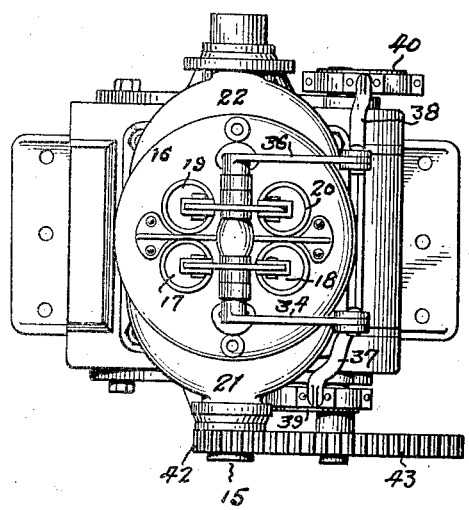
Fig. 2 is a top plan thereof.

The common method of controlling the intake and exhaust to the working cylinder of an explosion engine of the four-cycle type is by means of puppet valves operated from a cam shaft and working against the pressure in the explosion cylinder. The pressure against the valves not only increases the wear upon the valve operating mechanism, but requires the exertion of a greater effort to operate the valves than would be the case if the effect of the pressure could be eliminated.

By the present invention I have so arranged the valves that while they are constantly subject to the pressure in the explosion cylinder their operating movements are in opposite directions and the valves are so interconnected that they are balanced against each other, with the result that the only effort which must be exerted in operating the valve mechanism is one sufficient to overcome the friction of the valves in the respective valve chambers and their inertia.

Referring to the construction shown in Figs. 1 to 4, the engine here shown comprises the usual water cooled casing 10, explosion cylinder 11, piston 12 working therein, piston rod 13 extending to the crank 14 on the driving shaft 15. At one end of the explosion chamber I have provided a cylinder head 16 of special construction having four passages 17, 18, 19 and 20, all opening to the explosion chamber. An intake passage for the explosive mixture is provided at 21 communicating with the passages 17 and 18, and exhaust passage 22 on the opposite side of the head communicating with the passage 19 and 20. Within these several passages 17—20 are arranged piston valves 23, 24, 25 and 26, the skirts of which obstruct the ports 27 and 28 through which the intake and exhaust passages communicate with the valve chambers. These skirts are provided, however, with passages 29 adapted to be brought into register with the ports 27 and 28, the two passages 29 in the valves 23 and 24 registering simultaneously with the ports 27 opening to the intake, while the ports 29 in the valves 25 and 26 register simultaneously with the ports 28 through which communication is established to the exhaust passage 22. The valves are operated by adjustable rods 30, 31, 32, 33, connected respectively at their lower ends to the several valves. At their upper ends the rods 30, 31, are connected to the rocking lever 34 on opposite sides of its axis 35, while the rods 32 and 33 are connected in similar manner to the rocking lever 36. Rods 37 and 38 extend from the rocking levers 35 and 36 to eccentrics 39 and 40 on the countershaft 41 which is driven from the shaft 15 through pinion 42 and gear 43 meshing therewith at the ratio of 1 to 4. The eccentrics 39 and 40 are so arranged on the shaft 41 that the opening and closing of the intake and exhaust ports is exactly timed in a manner well understood in the art.

By moving the valve piston 23 up and the valve piston 24 down, in order to open the ports 27 to the intake simultaneously, it is obvious that the operating effort does not have to overcome the pressure in the explosion cylinder since the inward movement of one valve is balanced by the outward movement of the other. The same is of course true of the exhaust valves 25 and 26. The operation of the valves is thus very light and sensitive and involves little wear on the operating parts. In high speed engines this is a matter of considerable importance.

Figure 5:
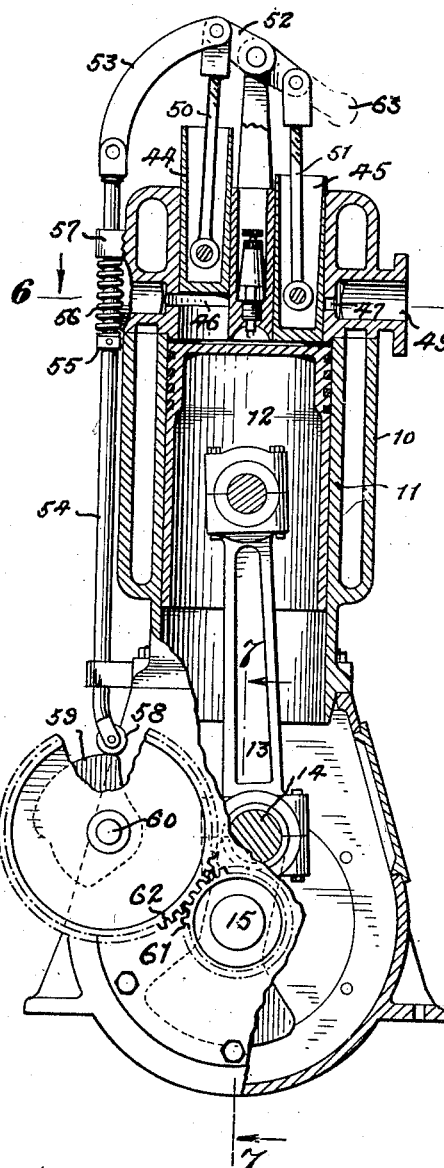
Fig. 5 is a vertical section through an explosion cylinder showing the modified valve arrangement.
Figure 6:
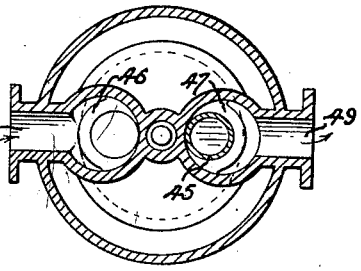
Fig. 6 is a section on the line 6—6, Fig. 5.
Figure 7:
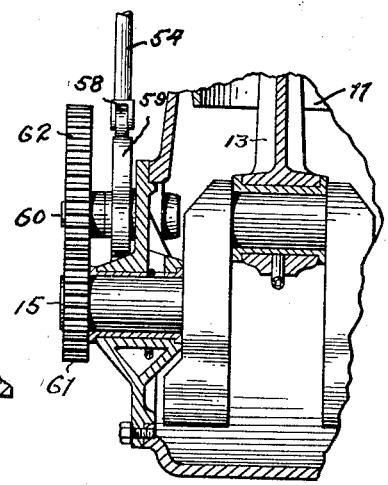
Fig. 7 is a section on the line 7—7, Fig. 5.

A modified construction is illustrated in Figs. 5 and 6. In this case but two valves 44 and 45 are used to control the inlet and exhaust ports 46 and 47 opening to the intake and exhaust passages 48 and 49 respectively. These valves are connected in like manner by rods 50 and 51 to opposite ends of a rocker bar 52, connected by a link 53 to the upper end of the valve rod 54. A collar 55 on the latter confines one end of the return spring 56, the opposite end of which abuts against a guide 57 fast with the cylinder head. At its lower end the rod 54 carries an antifriction roller 58 which runs on the periphery of the cam 59, on shaft 60, driven by gears 61 and 62 (at a two to one ratio) from the driving shaft 15. Obviously as the rocker shaft 52 is oscillated the valves 44 and 45 open or close their ports 46 and 47 and the cam 59 is so staged as to effect this movement with precise relation to the travel of the piston 12.

To balance the extended end of the levers 34 and 36 in the construction of Figs. 1 to 4, and the operating rods 37 and 38, or 54 in either construction, I may provide counterweights 63 on the rock levers.

I do not limit my invention to the precise valve arrangement indicated. Obviously the valves may be of different sizes if their movements are inversely as their areas so as to maintain a balanced resistance to movement. It is also evident that a plurality of valves may be provided to control one passage and a different number to control another passage, provided the areas of the valves are properly related to each other.

While I prefer the construction in which the valves are positively operated by eccentrics for high speed engines, the cam operated mechanism of Fig. 5 is satisfactory on low or moderate speed engines. In fact the spring 56 could be eliminated and a positive operation secured in this arrangement by permitting the roller 58 to run in a cam channel instead of upon the periphery of a cam. Again, it would be possible to assist the spring action, or altogether substitute it, by making the valves of unequal area so that the pressure thereon is unbalanced in such manner that a thrust is exerted thereby on rod 54 in the same direction as that now exerted by spring 56. This would be the case if the area of valve 45 exceeded that of valve 44.

Various other modifications in arrangement and detail of construction including usual constructions and adjustments where same have been omitted for clearness, will readily occur to those skilled in the art which do not depart from what I claim as my invention.

I claim:—

1. In a four cycle engine, an explosion cylinder, inlet and outlet passages opening thereto at one end of the cylinder, lateral ports opening to said passages, valves balanced against each other but working in said passages subject to the pressure in the explosion cylinder, together with means to operate said valves simultaneously in opposite directions with balanced action, on the principle of a four cycle engine.

2. In a four cycle engine, an explosion cylinder, pairs of inlet and outlet passages opening thereto at one end of the cylinder, lateral ports opening to said passages, valves working in said passages subject to the pressure in the explosion cylinder, together with means to operate the valves of each pair simultaneously in opposite directions with balanced action, on the principle of a four cycle engine.

3. In a four cycle engine, an explosion cylinder, inlet and outlet passages opening thereto at one end of the cylinder, lateral ports opening to said passages, valves balanced against each other but working in said passages subject to the pressure in the explosion cylinder, together with means to operate said valves simultaneously in opposite directions with balanced action, on the principle of a four cycle engine, in combination with means for water cooling the valve passages.

4. In a four cycle engine, an explosion cylinder, inlet and outlet passages opening thereto at one end of the cylinder, lateral ports opening to said passages, valves balanced against each other but working in said passages subject to the pressure in the explosion cylinder, together with means to operate said valves simultaneously in opposite directions with balanced action, on the principle of a four cycle engine, in combination with means to cool the area of the valves adjacent the explosion chamber.

5. In a four cycle engine a cylinder head pierced by inlet and outlet passages having their axes parallel to the axis of the cylinder, lateral ports opening to said passages, piston sleeve valves balanced against each other and working in said passages subject to the pressure in the engine cylinder and exposed on their outer faces to air cooling, together with means to operate said valves simultaneously in opposite directions with balanced action on the principle of a four-cycle engine.

6. In a four cycle engine, an explosion cylinder, a water jacket surrounding the same, a cylinder head pierced by inlet and outlet passages having their axes parallel to the axis of the cylinder, lateral ports opening through the water jacket to said passages, piston sleeve valves balanced against each other and working in said passages and exposed on their outer faces to air cooling, together with means to operate said valves simultaneously in opposite directions with balanced action on the principle of a four-cycle engine.

7. In a four cycle explosion engine, a cylinder head pierced by four passages having their axes parallel to the cylinder axis, two inlet and two exhaust ports respectively opening through the lateral walls of said passages, piston sleeve valves working in said passages subject to the pressure in the cylinder, but exposed on their outer faces to air cooling, together with means to operate pairs of said valves simultaneously in opposite directions on the principle of a four-cycle engine.

8. In a construction such as specified in claim 7, a working shaft driven by the engine, a countershaft geared thereto to rotate at lower speed, and means associated with the latter for operating the valves as specified.

9. In a construction such as specified in claim 7, a working shaft driven by the engine, a countershaft geared thereto to rotate at one-quarter the speed of the driving shaft, cams on said countershaft, and an operating connection therefrom to the valves for reciprocating the latter in the manner specified.

In testimony whereof I have signed my name to this specification in the presence of two subscribing witnesses.

INGLIS M. UPPERCU.

Witnesses:
 OSKAR FRIEDRICHT,
 GEORGE J. SABEL.